Jan. 14, 1958  S. T. MEYERS  2,820,195
IMPEDANCE MEASURING
Filed May 5, 1954  4 Sheets-Sheet 1

INVENTOR
S. T. MEYERS
BY R. B. Ardis
ATTORNEY

Jan. 14, 1958  S. T. MEYERS  2,820,195
IMPEDANCE MEASURING
Filed May 5, 1954  4 Sheets-Sheet 2

INVENTOR
S. T. MEYERS
BY R. B. Ardis
ATTORNEY

United States Patent Office

2,820,195
Patented Jan. 14, 1958

2,820,195

IMPEDANCE MEASURING

Stanley T. Meyers, East Orange, N. J., assignor to Bell Telephone Laboratories, Incorporated, New York, N. Y., a corporation of New York Application May 5, 1954, Serial No. 427,815

8 Claims. (Cl. 324—57)

This invention relates generally to impedance measurements and more particularly to circuits and methods suitable for measuring both positive and negative impedances.

A principal object of the invention is to permit the magnitudes and phase angles of both positive and negative impedances to be measured accurately in as simple a manner as possible.

A related object is to permit measurement of the magnitudes and phase angles of impedances without requiring any critical balances or calibrations in the measuring device.

Another object is to prevent changes in the sensitivity of the apparatus used for measuring impedance magnitude and phase angle from affecting the accuracy of the measurements.

In the past, many circuits and methods have been devised for measuring the magnitudes and phase angles of unknown impedances. In general, however, they have either required accurate measurement of voltages and currents or have involved critical balances, critical calibrations, or the use of active elements subject to changes in their sensitivity. Determination of impedance magnitude and phase angle by means of separate voltage and current measurements requires accurate determination of the magnitudes and phase angles of the voltages and currents measured and, in addition, involves a computation before the actual impedance data can be obtained. Voltage and current measurements are not, therefore, an entirely satisfactory way of obtaining impedance data outside of the laboratory. Prior art circuits and methods for obtaining a more direct reading of the magnitude and phase angle of an unknown impedance also tend to present difficulties under field conditions. Critical balances and calibrations tend to make prior art devices and methods difficult to employ by persons not highly skilled in their use. Those impedance measuring devices which are free from these disadvantages, however, usually contain active elements such as vacuum tubes as critical components of the measuring circuit. Such devices are subject to changes in measuring sensitivity due to aging and other factors. Finally, few of the direct reading impedance measuring devices found in the prior art are suitable for measuring negative as well as positive impedances.

The present invention simplifies the measurement of the magnitude and phase angle of an unknown impedance sufficiently to permit its use by relatively unskilled personnel. No critical balances are required and no critical calibration is necessary in order to achieve a high degree of accuracy. Furthermore, the basic components of the circuit used are all passive elements which are not subject to changes in their pertinent electrical characteristics. The circuits and methods featured by the invention are suitable for measurement of either positive or negative impedances.

In a principal aspect, the invention takes the form of an impedance measuring set comprising two transformers each having a primary winding and a pair of secondary windings, an oscillator connected across the primary winding of one transformer, a current detecting device such as a vacuum tube voltmeter connected across the primary winding of the other transformer, a variable standard resistance connected in series with one of the secondary windings of each of the transformers, and means to connect the unknown impedance in series with the other secondary windings of each of the transformers. In order to determine the magnitude of the unknown impedance, switching means is provided to permit the transmission from the oscillator to the detector through the respective circuit branches including the unknown impedance and the standard resistance to be observed separately, and means is provided to adjust the magnitude of the standard resistance until the two readings are equal. The absolute magnitude of the unknown impedance may then be read directly off dials indicating the magnitude of the standard resistance. In order to determine the phase angle of the unknown impedance, switching means is provided to permit observation of the transmission from the oscillator to the detector through both circuit branches simultaneously, reversal of the polarity of one of the transformer secondary windings relative to the others, and another observation of transmission through both circuit branches simultaneously. The difference between these two readings is related to the return loss of the unknown impedance against the standard resistance of equal magnitude and is a measure of the phase angle of the unknown impedance. A positive return loss indicates that the resistance component of the unknown impedance is positive, while a negative return loss (a return gain) indicates a negative resistance component.

The transformer windings employed in specific embodiments of the invention are stable passive elements which are not subject to change in their operating characteristics by the passage of time. While the oscillator and the current detecting device may, and generally do, include active elements, changes in their sensitivity or calibration do not affect the accuracy of the impedance measurements made possible by the present invention. In determining impedance magnitude, detector readings are equalized, without regard to their actual values, while in determining phase angle, the only observation to be made is the difference between the two readings, the actual values of each reading being disregarded.

In most embodiments of the invention, additional switching means is provided to connect a reactance (generally a capacitance) first across the unknown impedance and then across the standard resistance. Transmission through the measuring circuit transformers, when both the standard and unknown impedances are connected and the polarity of one of the secondary windings is reversed, is observed in both instances and the direction of the change is an indication of the sense (as to whether it is positive or negative) of the reactive component of the unknown impedance.

A more complete understanding of the invention may be obtained from a study of the following detailed description of a specific embodiment and analysis of its principles of operation. In the drawings.

Figure 2:
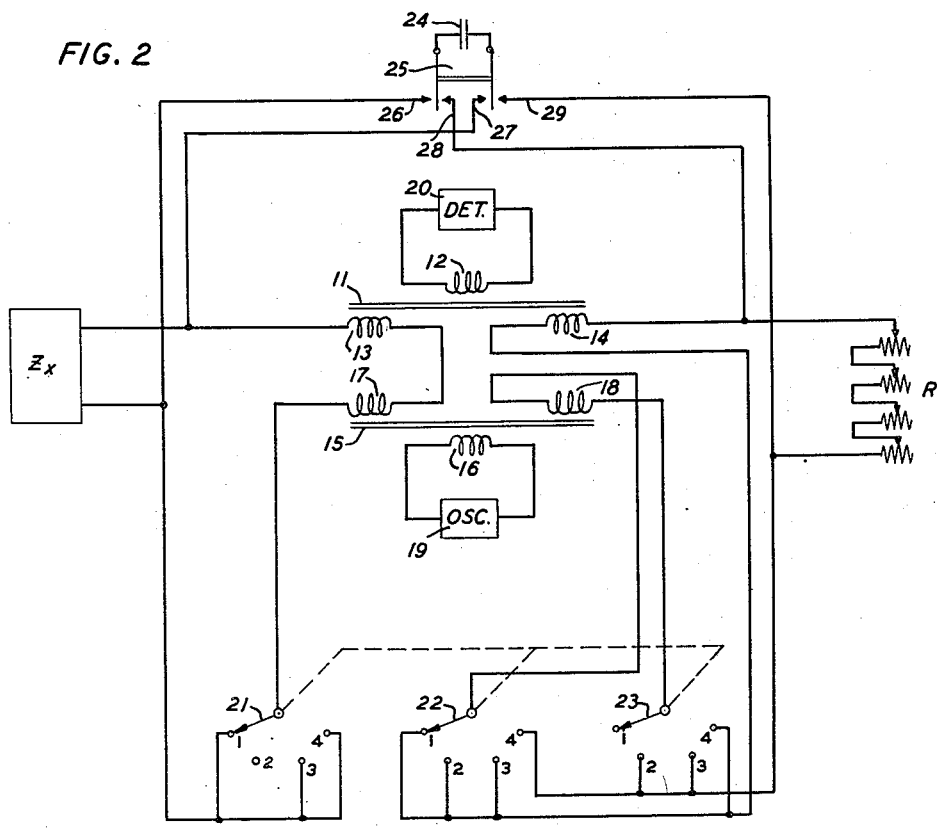
Fig. 2 illustrates a specific embodiment of the invention which may readily be employed to measure the magnitudes and phase angles of either positive or negative impedances.
Figure 3A:
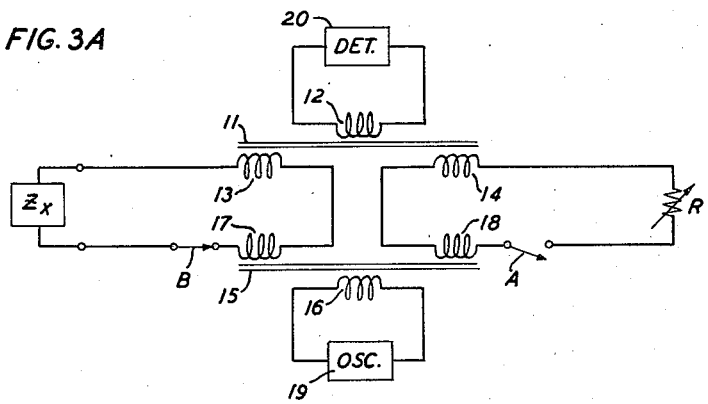
Figure 3B:
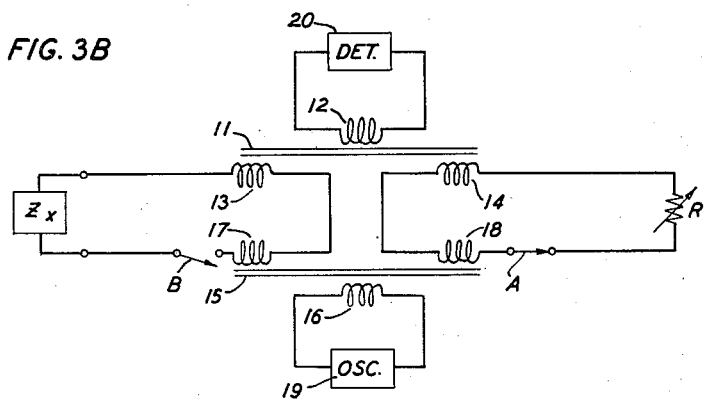
Figure 3C:
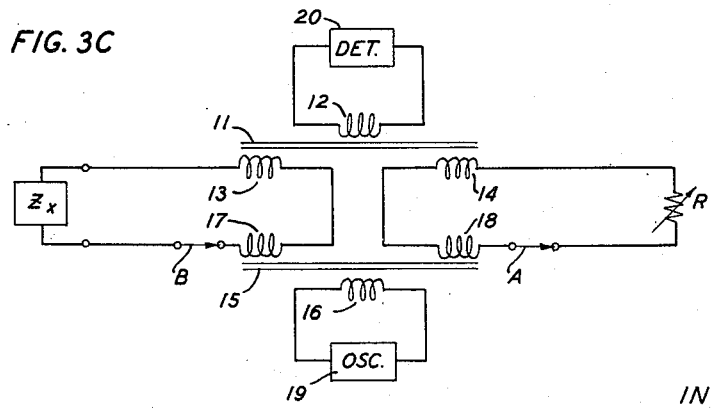
Figure 3D:
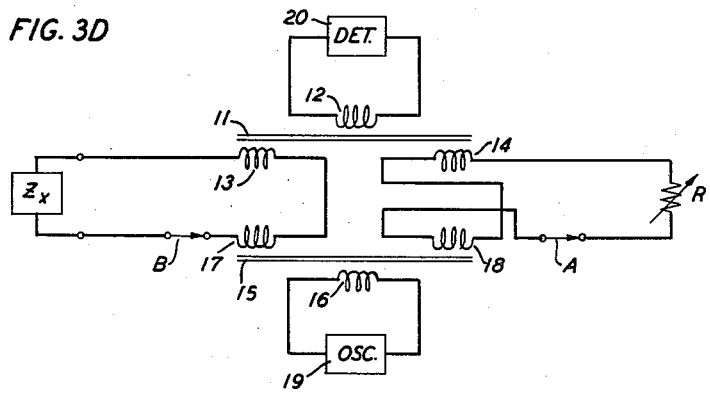
Figure 3E:
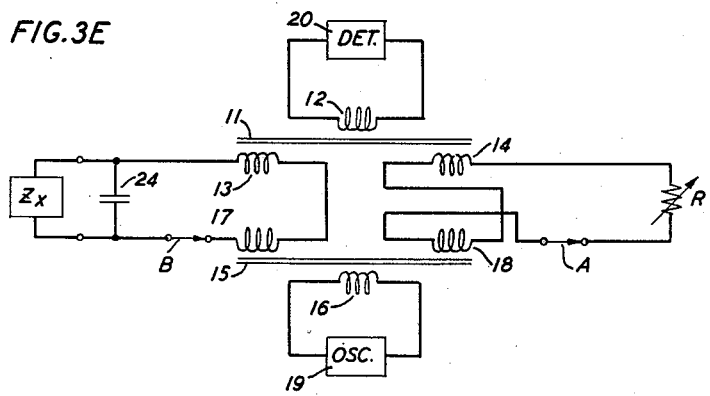
Figure 3F:
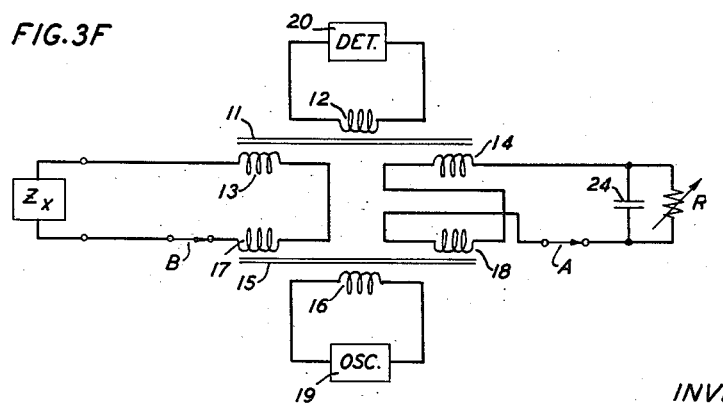
Figure 4:
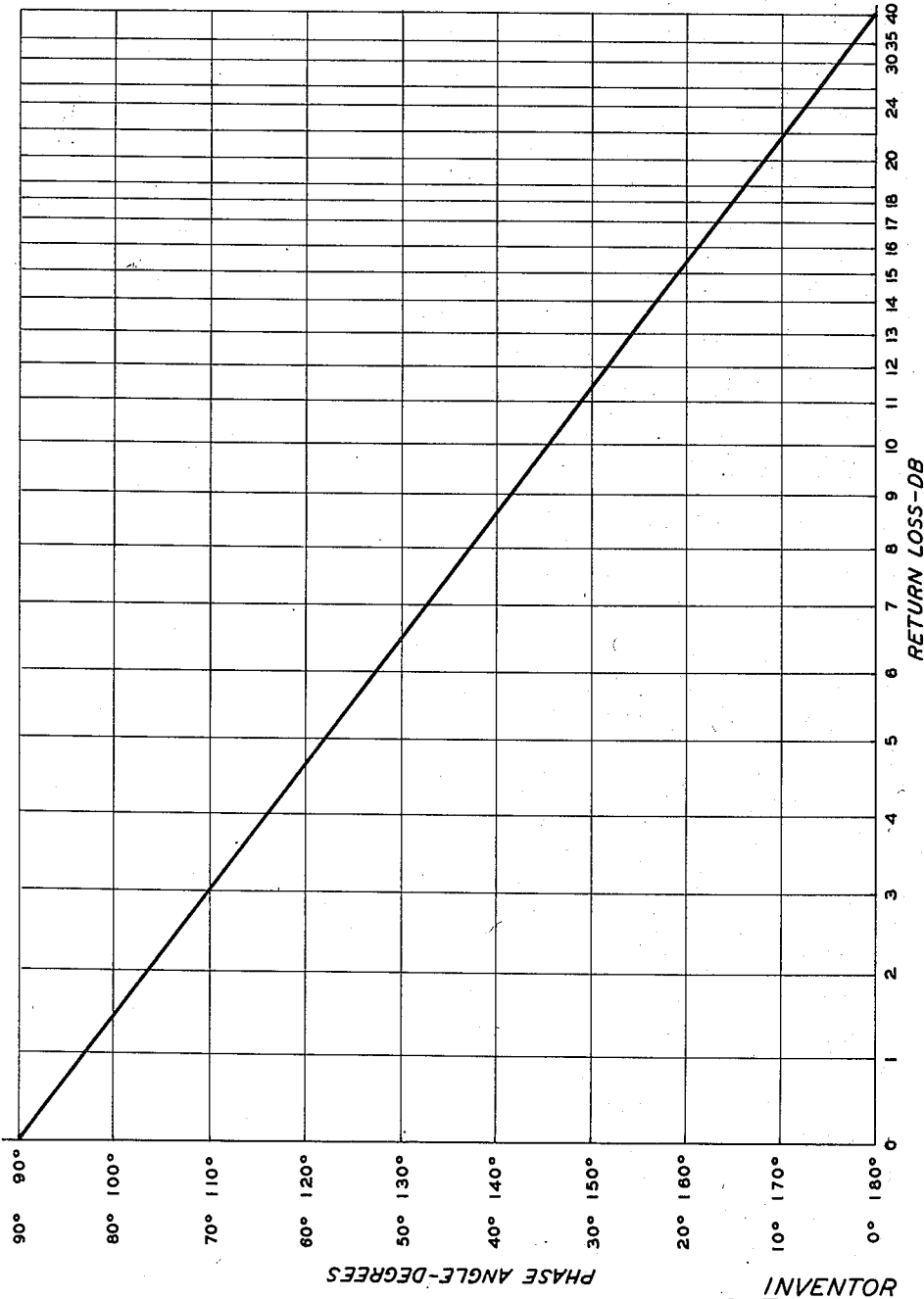

Figs. 3A through 3F show the exact circuit arrangements for different positions of the master control switches in the embodiment of the invention illustrated in Fig. 2; and Fig. 4 is a computed curve showing the relationship between return loss in db and the phase angle of the unknown impedance. This is used to determine the phase angle from the return loss measurement made with the circuit illustrated in Fig. 2.

Figure 1:
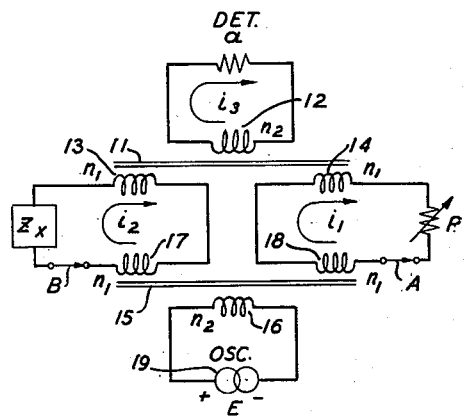
Fig. 1 is a simplified representation of an embodiment of the invention, used for purposes of mathematical analysis.

The principles underlying the present invention may best be explained with the aid of the simplified sketch of the embodiment of the invention given in Fig. 1. Fig. 1 shows a transformer 11 having a primary winding 12 and a pair of secondary windings 13 and 14 and a transformer 15 having a primary winding 16 and a pair of secondary windings 17 and 18. An oscillator 19 is connected across primary winding 16, while a suitable current detecting device, represented by its internal resistance $a$, is connected across primary winding 12. A variable standard resistance R is connected in series with secondary windings 14 and 18, and the impedance to be measured $Z_x$ is connected in series with secondary windings 13 and 17. A switch A is shown connected in series with standard resistance R and secondary windings 14 and 18, and a switch B is shown connected in series with the unknown impedance $Z_x$ and secondary windings 13 and 17.

Although it is not an essential feature of the invention, the two transformers 11 and 12 are generally substantially identical. In Fig. 1, the number of turns of each of the four secondary windings is designated $n_1$, while the number of turns of each of the two primary windings is designated $n_2$. The voltage produced across winding 16 by oscillator 19 is designated E, while $i_1$ is the current through standard resistance R and windings 14 and 18, $i_2$ is the current through unknown impedance $Z_x$ and windings 13 and 17, and $i_3$ is the current through winding 12 and detector resistance $a$.

In transformers 11 and 15, $n_2$ is large in comparison with $n_1$, making $$a\frac{n_1^2}{n_2^2} \ll Z_x \qquad (1)$$

and $$a\frac{n_1^2}{n_2^2} \ll R \qquad (2)$$

The magnitude of the current $i_3$ in the detector circuit which results from the impressed voltage E of the oscillator 19 has the value $$|i_3| = \left|\frac{E}{Z_x}\frac{n_1^2}{n_2^2}\right| \qquad (3)$$

when switch B is closed and switch A is open, and has the value $$|i_3| = \left|\frac{E}{R}\frac{n_1^2}{n_2^2}\right| \qquad (4)$$

when switch A is closed and switch B is open. Comparison of the currents in Equations 3 and 4 by means of a suitable indicating arrangement (such as a vacuum tube voltmeter) reveals that $$R = |Z_x| \qquad (5)$$

when the indicating arrangement shows the magnitude of $i_3$ to be the same in the two situations. In accordance with a feature of the present invention, this is accomplished by adjusting standard resistance R until the two readings for $i_3$ are equal. The magnitude of the unknown impedance $Z_x$ is then read off dials indicating the magnitude of the standard resistance R.

With the standard resistance R thus made equal to the absolute magnitude of $Z_x$, the phase angle of $Z_x$ is, in accordance with the present invention, determined by effecting a simultaneous comparison of the currents through R and $Z_x$ by closing both switches A and B. When the coil windings are poled as shown in Fig. 1, the current $i_3$ in the detector circuit is $$i_3 = E\frac{n_1}{n_2}\frac{R+Z_x}{RZ_x + a(R+Z_x)n_1/n_2} \qquad (6)$$

When, in accordance with the invention, any one of the secondary transformer windings is reversed in polarity with respect to the others, the current $i_3$ is $$i_3 = E\frac{n_1}{n_2}\frac{R-Z_x}{RZ_x + a(R+Z_x)n_1/n_2} \qquad (7)$$

A comparison, in the indicating arrangement, of the current $i_3$ as given in Equations 6 and 7 yields the ratio $$\Delta = \frac{R-Z_x}{R+Z_x} \qquad (8)$$

which may be interpreted as the return loss of $Z_x$ against R. In db, this return loss is defined as $$\text{Return loss} = 20\ \log_{10}\frac{R-Z_x}{R+Z_x} \qquad (9)$$

When $$R = |Z_x| \qquad (5)$$

this return loss gives a measure of the phase angle of the unknown impedance $Z_x$, following the relation $$\theta = 2\ \tan^{-1} \Delta \qquad (10)$$

where $\theta$ is the phase angle of the unknown impedance.

A specific impedance measuring set embodying the invention is illustrated in Fig. 2. The circuit arrangement shown is the same as Fig. 1 and includes the same pair of substantially identical transformers 11 and 15. Transformer 11 has a primary winding 12 and a pair of secondary windings 13 and 14, and transformer 15 has a primary winding 16 and a pair of secondary windings 17 and 18. An oscillator 19, tunable over a sufficiently wide frequency range to permit impedance measurements over the desired band, is connected across winding 16, while a suitable current detecting device 20 is connected across winding 12. Detector 20 may, for example, be a vacuum tube voltmeter such as the one disclosed in United States Patent 2,147,729, issued February 21, 1939, to A. V. Wurmser.

In the embodiment of the invention shown in Fig. 2, the standard resistance R and the unknown impedance $Z_x$ are connected to the transformer secondary windings by means of three ganged four-position rotary switches 21, 22, and 23. Corresponding ends of windings 13 and 17 are connected together, and the other end of winding 13 is connected to one side of the unknown impedance $Z_x$. The other end of winding 17 is connected to the movable arm of switch 21, while the other side of $Z_x$ is connected to the first, third, and fourth contacts of switch 21. The second contact of switch 21 is left open. In order to permit its polarity to be reversed independently of the other secondary windings, opposite ends of winding 18 are connected to the movable arms of switches 22 and 23, respectively. One end of winding 14 is connected to one side of standard resistance R, while the other end is connected to the first, second, and third contacts of switch 22 and to the fourth contact of switch 23. The other side of standard resistance R is connected to the fourth contact of switch 22 and to the second and third contacts of switch 23. The first contact of switch 23, like the second contact of switch 21, is left open.

The standard resistance R in the impedance measuring set illustrated in Fig. 2 is in general, a variable resistance of the decade type. As shown, four separate variable resistors may be used, having maximum resistance of 10, 100, 1000, and 10,000 ohms, respectively. When the decade resistance is arranged so that the values of the individual variable resistances appear on individual dials calibrated from 1 to 10, the total magnitude of the standard resistance R is read directly off the group of dials.

An additional feature of the embodiment of the invention shown in Fig. 2 includes an arrangement for connecting a small capacitance 24 first across the unknown impedance $Z_x$ and then across the standard resistance R. A normally open switch 25 is provided with two closed positions. In the first closed position, a pair of contacts 26 and 27 connect capacitance 24 across $Z_x$, while in the second, another pair of contacts 28 and 29 connect capacitance 24 across R.

The operation of the embodiment of the invention illustrated in Fig. 2 may best be explained in detail with the aid of Figs. 3A through 3F. Figs. 3A through 3D represent the circuit arrangements obtained when ganged switches 21, 22 and 23 in Fig. 2 are turned to positions 1 through 4, respectively, while Figs. 3E and 3F represent the circuits obtained from the two closed positions of switch 25 in Fig. 2, master switches 21, 22 and 23 remaining in their fourth positions.

An impedance reference is established when the transmission from oscillator 19 through transformers 11 and 15 is measured with the connection to the unknown impedance $Z_x$ closed and the connection to the standard resistance R open. This circuit arrangement is illustrated in Fig. 3A and is obtained when ganged switches 21, 22 and 23 in Fig. 2 are in their first position. A second transmission measurement is made through transformers 11 and 15 with the connection to $Z_x$ open and the connection to the resistance standard R closed. This arrangement is shown in Fig. 3B and is secured when switches 21, 22 and 23 in Fig. 2 are in their second position. The transmission through transformers 11 and 15 is then adjusted to obtain the same value for both master switch positions by varying the adjustment of the decade resistance standard R. When the two readings are equal, the resistance of the resistance standard in ohms is equal to the absolute magnitude of the unknown impedance.

When the magnitude of the resistance standard R and the unknown impedance $Z_x$ are the same, the present invention permits the phase angle of the unknown impedance to be determined readily by a comparison of the transmission through transformers 11 and 15 for two different polings of any one of the transformer secondary windings. Winding 18 of transformer 15 is the one reversed in the embodiment of the invention shown in Fig. 2. The first poling, which is used as a reference, is illustrated in Fig. 3C and is obtained in the third position of switches 21, 22 and 23 in Fig. 2. Such a circuit arrangement yields a measure of the transmission through transformers 11 and 15 when the current in the unknown branch and the current in the resistance branch are added vectorially in the detector winding 12. The reverse poling of winding 18 is illustrated in Fig. 3D and is obtained when ganged switches 21, 22 and 23 in Fig. 2 are in their fourth position. The resulting circuit gives a measure of the transmission through transformers 11 and 15 when the currents in the resistance and unknown branches are subtracted vectorially in the detector circuit.

The difference between the two readings is, in effect, a return loss measurement of the unknown impedance against a known resistance of equal magnitude and may, therefore, be interpreted as a measure of the phase angle of the unknown impedance. Fig. 4 is a curve of phase angle plotted against return loss and may be used for convenient interpretation of the return loss measurement in terms of phase angle.

After the phase angle of the unknown impedance has been ascertained, it is generally necessary to determine the sense of the angle, that is, whether the unknown impedance contains positive or negative reactance. The embodiment of the invention illustrated in Fig. 2 permits such a determination through the use of capacitance 24 and switch 25. A reference condition is established by shunting capacitance 24 across the unknown impedance as illustrated in Fig. 3E. Switches 21, 22 and 23 in Fig. 2 remain in their fourth position for these final measurements. Capacitance 24 is then shunted across the resistance standard as shown in Fig. 3F, and note is made of the direction of the change in transmission. An increase in transmission in going from the arrangement of Fig. 3E to that of Fig. 3F indicates a positive reactance, while a decrease in transmission indicates a negative phase angle. The reference condition of Fig. 3E is established to minimize indicational errors at small phase angles of the unknown impedance.

As pointed out above, Fig. 4 is a graph relating the return loss between any two impedances of equal magnitude to the phase angle between them. It is provided with two different phase-angle scales, one reading from zero to 90 degrees and the other reading from 90 degrees to 180 degrees. Which scale to use is determined from the return loss measurement described in connection with Figs. 3C and 3D. When the return loss is positive, the unknown impedance contains positive resistance and its phase angle must lie between zero and ±90 degrees. For negative return loss (return gain), the unknown impedance contains negative resistance and the phase angle must lie between ±90 degrees and ±180 degrees. The sense of the phase angle (as to whether it is positive or negative) is determined as described in connection with Figs. 3E and 3F.

Finally, it should be noted that the measurement of the reutrn loss between any two impedances can be accomplished by substituting a second unknown impedance for the resistance standard R in the embodiment of the invention illustrated in Fig. 2. Operating ganged switches 21, 22 and 23 between their third and fourth positions gives a direct measurement of that quantity.

It is to be understood that the arrangements which have been described are illustrative of the application of the principles of the invention. Numerous other arrangements may be devised by those skilled in the art without departing from the spirit and scope of the invention.

What is claimed is:

1. An impedance measuring set for both positive and negative impedances which includes, in combination, a transformer having a first primary winding, a second secondary winding, and a third secondary winding, a transformer having a fourth secondary winding, a fifth secondary winding, and a sixth primary winding, means to connect an oscillator across said first winding, means to connect a current measuring device across said sixth winding, means to connect said second and fourth windings and the unknown impedance in series, the impedance external to the unknown impedance in the circuit path including said second and fourth windings being many times smaller than the unknown impedance, means to connect said third and fifth windings and a standard resistance in series, the impedance external to the standard resistance in the circuit path including said third and fifth windings being many times smaller than the standard resistance, means to determine the magnitude of the unknown impedance which comprises switching means to measure the transmission from said oscillator through said first, second, fourth, and sixth windings with the series circuit including the standard resistance open, switching means to measure the transmission from said oscillator through said first, third, fifth, and sixth windings with the series circuit including the unknown impedance open, and means to adjust the magnitude of the standard resistance until said transmission through said first, third, fifth, and sixth windings is equal to said transmisson through said first, second, fourth, and sixth windings, and means to determine the phase angle of the unknown impedance which comprises switching means to measure the transmission from said oscillator through said transformers when the currents in the unknown impedance and the standard resistance add vectorially in said sixth winding, and switching means to measure the transmission from said oscillator through said transformers when the currents in the unknown impedance and the standard resistance subtract vectorially in said sixth winding.

2. An impedance measuring set in accordance with claim 1 which includes means to determine the sense of the phase angle of the unknown impedance which comprises switching means to connect a reactance across the unknown impedance and switching means to connect the same reactance across the standard resistance.

3. An impedance measuring set in accordance with claim 1 which includes means to determine the sense of the phase angle of the unknown impedance which comprises switching means to connect a capacitance across the unknown impedance and switching means to connect the same capacitance across the standard resistance.

4. An impedance measuring set for both positive and negative impedances which includes, in combination, a transformer having a first primary winding, a second secondary winding, and a third secondary winding, a transformer having a fourth secondary winding, a fifth secondary winding, and a sixth primary winding, means to connect an oscillator across said first winding, means to connect a current measuring device across said sixth winding, means to connect said second and fourth windings and the unknown impedance in series, the impedance external to the unknown impedance in the circuit path including said second and fourth windings being at least an order of magnitude smaller than the unknown impedance, means to connect said third and fifth windings and a standard resistance in series, the impedance external to the standard resistance in the circuit path including said third and fifth windings being at least an order of magnitude smaller than the standard resistance, means to determine the magnitude of the unknown impedance which comprises switching means to measure the transmission from said oscillator through said first, second, fourth, and sixth windings with the series circuit including the standard resistance open, switching means to measure the transmission from said oscillator through said first, third, fifth, and sixth windings with the series circuit including the unknown impedance open, and means to adjust the magnitude of the standard resistance until said transmission through said first, third, fifth, and sixth windings is equal to said transmission through said first, second, fourth, and sixth windings, and means to determine the phase angle of the unknown impedance which comprises switching means to measure the return loss of the unknown impedance against the standard resistance.

5. An impedance measuring set for both positive and negative impedances which includes, in combination, a transformer having a first primary winding, a second secondary winding, and a third secondary winding, a transformer having a fourth secondary winding, a fifth secondary winding, and a sixth primary winding, means to connect an oscillator across said first winding, means to connect a current measuring device across said sixth winding, means to connect said second and fourth windings and the unknown impedance in series, the impedance external to the unknown impedance in the circuit path including said second and fourth windings being at least several times smaller than the unknown impedance, means to connect said third and fifth windings and a standard resistance in series, the impedance external to the standard resistance in the circuit path including said third and fifth windings being at least several times smaller than the standard resistance, means to determine the magnitude of the unknown impedance which comprises switching means to measure the transmission from said oscillator through said first, second, fourth, and sixth windings with the series circuit including the standard resistance open, switching means to measure the transmission from said oscillator through said first, third, fifth, and sixth windings with the series circuit including the unknown impedance open, and means to adjust the magnitude of the standard resistance until said transmission through said first, third, fifth, and sixth windings is equal to said transmisson through said first, second, fourth, and sixth windings, and means to determine the phase angle of the unknown impedance which comprises switching means to measure the transmission from said oscillator through said transformers with the series circuits including the unknown impedance and the standard resistance both closed, and switching means to reverse the polarity of one of said secondary windings with respect to the others of said secondary windings.

6. In an impedance measuring set which includes first and second transformers each having a primary winding and a pair of secondary windings, an oscillator connected across the primary winding of said first transformer, a current measuring device connected across the primary winding of said second transformer, and a standard resistance connected in series with one of the secondary windings of each of said transformers, the method of determining the magnitude, the phase angle, and the sense of the phase angle of an unknown impedance connected in series with the other secondary windings of each of said transformers which comprises measuring the transmission from said oscillator through said transformers with the series circuit including the unknown impedance closed and the series circuit including the standard resistance open, measuring the transmission from said oscillator through said transformers with the series circuit including the unknown impedance open and the series circuit including the standard resistance closed, adjusting the magnitude of the standard resistance until the transmission with the series circuit including the unknown impedance open and the series circuit including the standard resistance closed equals the transmission with the series circuit including the unknown impedance closed and the series circuit including the standard resistance open, measuring the transmission from said oscillator through said transformers with both of said series circuits closed, reversing the polarity of one of said secondary windings with respect to the others of said secondary windings and measuring again the transmission from said oscillator through said transformers with both of said circuits closed, connecting a capacitance across the unknown impedance and measuring the transmission with both of said series circuits closed, and connecting the same capacitance across the standard resistance and measuring the transmission with both of said series circuits closed.

7. An impedance measuring set for both positive and negative impedances which includes, in combination, first and second transformers each having a primary winding and a pair of secondary windings, each of said transformers having a turns ratio from its primary winding to each of its secondary windings many times greater than unity, means to connect an oscillator across the primary winding of said first transformer, means to connect a current measuring device across the primary winding of said second transformer, means providing a series circuit consisting impedance-wise of the unknown impedance and one of the secondary windings of each of said transformers, means providing a series circuit consisting impedance-wise of a standard resistance and the other secondary windings of each of said transformers, means to adjust the magnitude of the standard resistance until it is equal to the magnitude of the unknown impedance, means to determine the phase angle of the unknown impedance which comprises switching means to measure the transmission from said oscillator through said transformers when the currents in the unknown impedance and the standard resistance add vectorially in the primary winding of said second transformer and switching means to measure the transmission from said oscillator through said transformers when the currents in the unknown impedance and the standard resistance subtract vectorially in the primary winding of said second transformer, and means to determine the sense of the phase angle of the unknown impedance which comprises switching means to connect a reactance across the unknown impedance and switching means to connect the same reactance across the standard resistance.

8. An impedance measuring set for both positive and negative impedances which includes, in combination, first and second transformers each having a primary winding and a pair of secondary windings, each of said transformers having a turns ratio from its primary winding to each of its secondary windings many times greater than unity, means to connect an oscillator across the primary winding of said first transformer, means to connect a current measuring device across the primary winding of said second transformer, means providing a series circuit consisting impedance-wise of the unknown impedance and one of the secondary windings of each of said transformers, means providing a series circuit consisting impedance-wise of a standard resistance and the other secondary windings of each of said transformers, means to adjust the magnitude of the standard resistance until it is equal to the magnitude of the unknown impedance, means to determine the phase angle of the unknown impedance which comprises switching means to measure the transmission from said oscillator through said transformers when the currents in the unknown impedance and the standard resistance add vectorially in the primary winding of said transformer and switching means to measure the transmission from said oscillator through said transformers when the currents in the unknown impedance and the standard resistance subtract vectorially in the primary winding of said second transformer, and means to determine the sense of the phase angle of the unknown impedance which comprises switching means to connect a capacitance across the unknown impedance and switching means to connect the same capacitance across the standard resistance.

References Cited in the file of this patent

UNITED STATES PATENTS

| | | |
|---|---|---|
| 1,684,403 | Mason | Sept. 18, 1928 |
| 2,581,085 | Edelman | Jan. 1, 1952 |
| 2,777,114 | Lowe | Jan. 8, 1957 |